Nov. 10, 1936. D. L. LOETSCHER 2,060,736
PROCESS FOR TREATING FOODSTUFFS
Filed Feb. 18, 1933
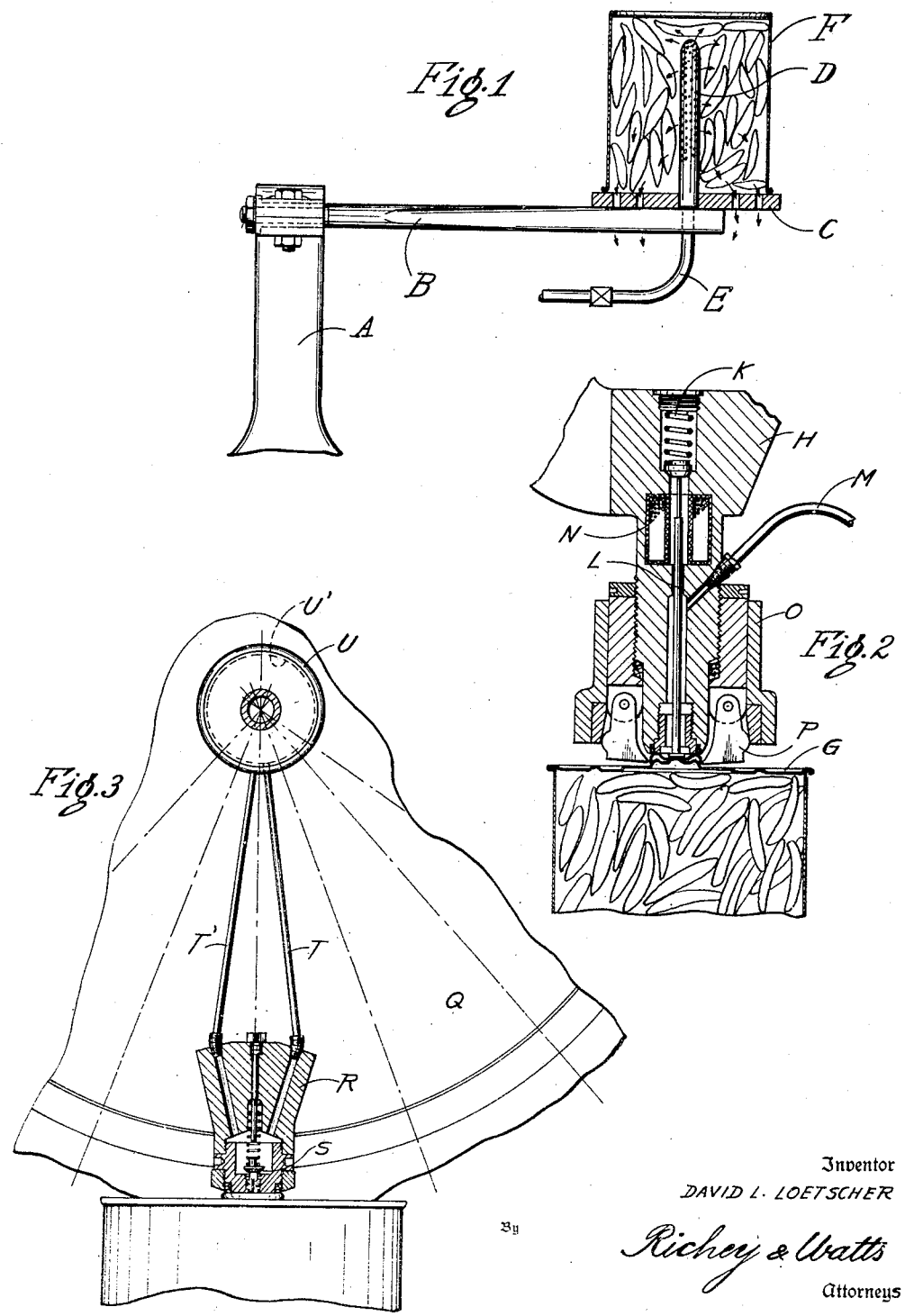
Inventor
DAVID L. LOETSCHER
By Richey & Watts
Attorneys Patented Nov. 10, 1936

2,060,736

UNITED STATES PATENT OFFICE 2,060,736

PROCESS FOR TREATING FOODSTUFFS

David L. Loetscher, Flushing, N. Y., assignor, by mesne assignments, to The Crown Cork and Seal Company, Inc., New York, N. Y., a corporation of New York Application February 18, 1933, Serial No. 657,381

4 Claims. (Cl. 99—182)

This invention relates to the art of treating food stuffs in containers and relates particularly to new and improved methods of treating and packing food stuffs such as fruits, vegetables, and in general food stuffs which may be broadly characterized as being substantially dry and solid in form.

The expression "substantially dry" appearing in this specification, is used to describe food products which do not contain or carry any material amount of added liquid, including water. This expression, as used herein, is properly descriptive of raw cut apples, grapefruit sections, berries, cherries and the like. The expression "solid food products" appearing in this specification, is used to describe substances of the character just mentioned which can be retained in a container having a bottom provided with means such as apertures or perforations thru which steam or water may freely pass.

Efforts have been made heretofore to subject solid stuffs in containers to the heating or sterilizing action of steam, but such efforts have met with little or no success so far as I am aware, for various reasons. One obstacle encountered in these efforts was, that the container would retain condensed steam and liquid from possibly other sources, and this liquid would remove the color of the food, thus making the food stuffs less attractive to the eye, or would remove some of the nutritive value from the food stuffs, and would interfere with the uniform treatment of the food as well as tend to make parts of it soft, soggy, or liable to disintegration.

According to the present invention, these difficulties and the attendant evils and disadvantages have been avoided. This invention makes it possible to bring steam into intimate contact with substantially all of the solid food stuffs in a container, to do so for any length of time desired, while preventing accumulation of any added liquid in the container. Thus the invention makes it possible to heat the food products in a container to any temperature up to about 212° F., and to permit the sealing of the container with the food stuffs in a substantially dry condition. Moreover, this invention makes it possible to treat food stuffs as just described and then subject the food stuffs to additional treating steps, such as vacuumizing the container before final sealing, or vacuumizing the container and subjecting the contents to a higher temperature treatment for cooking or other purposes.

The present invention will be fully understood from the following detailed description of it and certain of its applications, reference being had to the drawing accompanying and forming a part of this specification.

Fig. 1 illustrates diagrammatically one form of apparatus for carrying out the present invention;

Fig. 2 illustrates diagrammatically one form of apparatus by which a container may be vacuumized after the food stuffs therein have been treated with apparatus as indicated in Fig. 1.

Fig. 3 illustrates diagrammatically one form of apparatus by which food stuffs in a container may be vacuumized and sterilized or cooked after having been treated by means of the apparatus illustrated in Fig. 1.

In Fig. 1, A designates a suitable support carrying a rotatably mounted shaft or rod B provided at one end with a perforated plate C and a tube D closed at one end and having perforated side walls above the plate C and a suitable steam line connection E attached thereto below the plate C. F designates a container for the food stuffs to be treated. This container may be a tin can of the type commonly used for food products and open at one end. Fig. 1 shows the several parts thus described and assembled ready for treatment by the present process.

The present process may be practiced by apparatus such as shown in Fig. 1, by first placing substantially dry solid food stuffs in the container, which is open at one end. Then the rod B is rotated so that the tube D points downwardly, when the can is telescoped over the tube D and rests against the plate C with the end of the tube D reaching approximately to the bottom of the can. Then the can, plate C and rod B are rotated together into the position shown in Fig. 1, whereupon steam under some pressure, for example at about 30 pounds pressure is admitted into the tube D and is liberated from the tube D within the container and into intimate contact with substantially all of the food stuff therein. This steam escapes freely thru the perforations in the plate C, which perforations are preferably located near the outer periphery of the container, and at the same time any steam which condenses in the container or any liquid which may be formed in the can may also freely escape. Steam is discharged into the container in this manner for a longer or shorter period of time, as desired, but such liberation of steam is preferably continued until the temperature of the container has been raised to between about 150° F. and about 212° F. It is preferred that the heating be carried on until a temperature within this range is attained, for sterilization of the food stuff requires temperatures in this range.

This treatment may also be continued for practically any desired length of time. Periods of about one minute to about two and one-half minutes have been used satisfactorily, it being understood that with a shorter length of time the temperature attained by the food stuffs is lower than when a longer time is used.

When the liberation of steam into the container as just described has been carried out for the desired length of time and the desired temperature is attained, the steam is shut off from the tube D, the rod B is rotated and the can removed, after which the can and its contents may be treated according to various steps. For example, the can may be sealed by permanently fastening an ordinary can end in place on the open end of the can; or the can may be subjected to vacuumizing treatment using any suitable can end and vacuum sealing apparatus, or to a vacuumizing and sterilizing treatment before final sealing. Hot syrup or brine may be placed in the container before the vacuumizing or before the vacuumizing and sterilizing treatment if desired. The can and its contents may, after final sealing, be cooled quickly, or may have the temperature sustained for a greater or shorter length of time, or the temperature may even be increased as may be desired. To ensure complete sterilization, particularly with container ends or covers which are applied while cold to the container, the sealed container may be immersed in a suitable sterilizing medium, such for example as steam at approximately 212° F., for about a minute, or in boiling water for about two minutes.

In the event that the contents of the can are to be vacuumized after the foregoing sterilizing treatment, the interior of the can may be connected to a source of vacuum, after a hot syrup or brine is placed in the can, in case any such liquid is to be used, and gases thus removed from the interior of the can, after which the can may be permanently sealed. Raw fruits, including grapefruit sections, also apples, cherries, strawberries, and in general substantially any food in a substantially dry condition, may be sterilized by the above described process and then sealed either with or without being subjected to the vacuumizing step just mentioned, the primary purpose of the vacuumizing step being to remove a large proportion of the oxygen of the air which otherwise would be sealed in the container and which might result in some deterioration of the food stuff or loss or change of taste.

The apparatus shown in Fig. 2 may be employed for carrying out the vacuumizing step described in the immediately preceding paragraph. The can F, after having been subjected to treatment with the apparatus shown in Fig. 1, is provided with an end G carrying a valve. Then the head H is brought into assembled relation with the valved end of the can substantially as shown, the spring K forcing the rod L against the movable part of the valve to hold it in open position, while a source of vacuum (not shown) is connected to the tube M and gases are withdrawn thru the valve from the can. When the interior of the can has been vacuumized to the desired extent, a current of electricity is passed thru the solenoid windings N, resulting in upward movement of the rod L and magnetizing the rod and causing the latter to lift the movable part of the valve into sealing position, whereupon the chuck O is moved downwardly, forcing the fingers P against the raised part of the valve and crimping it beneath the movable part of the valve to fix the latter permanently in sealing position. The valve shown is claimed in Fenn Patent No. 1,728,533.

In the event that the food stuffs to be treated and packed are vegetables which require treatment with steam of the right temperature for cooking as well as sterilizing, the present process may be followed by the above mentioned vacuumizing and sterilizing treatment. In that case, after the temperature of the container and the vegetables has been raised to the desired point by liberation of steam within the container, the container is provided with a valved end and, with or without the addition of hot syrup or brine, is then, while the contents of the can is still at a high temperature, subjected to the vacuumizing and sterilizing treatment in which the gases are first removed from the interior of the can thru the valve under the influence of the vacuum of for example 25" to 28" of mercury, and immediately thereafter steam under high pressure is passed thru the valve into the container while the latter is being rotated about the valved end of the can, so that the steam passes up thru the contents of the container and into contact with substantially every portion thereof, with resultant agitation of the vegetables therein. This steam treatment raises the contents of the container to between about 240° F. and 260° F. within about fifteen seconds' time for example, after which the connection between the can and the source of steam under pressure is broken, the movable part of the valve is forced into seated position by pressure within the can and the valve is then firmly locked in seated position. If it is desired to cool the can and its contents quickly, as may be the case with certain vegetables which do not require long cooking, this may be done by spraying cold water on the sealed cans, plunging them into a bath of cold water, or both. In case it is desired to sustain the temperature of the can and its contents to permit more thorough or more extensive cooking to take place, this may be done by discharging live steam against the sealed container or passing the can thru a steam-filled chamber, or thru an insulated chamber containing hot air at a temperature about equal to that of the contents of the container as it leaves the sterilizing unit.

Apparatus for carrying out the step of vacuumizing and sterilizing after food stuffs have been treated according to the process depicted in Fig. 1 is indicated in Fig. 3. For a more complete disclosure of the details of apparatus here fragmentarily illustrated, reference is made to the copending application of John Mills, Serial No. 629,678, filed August 20, 1932. However, the construction and operation of that apparatus will be understood from the following brief description of Fig. 3.

Q designates a wheel rotatable about a horizontal axis in carrying a plurality of stations, only one of which is shown in the figure. Each station comprises a head R provided with a spring-pressed valve opener S to contact with the valved can end and having passages connecting respectively through conduits T and T' to rotating valves U and U', which in turn are connected respectively to a source of vacuum and to a source of steam under pressure. The can is held in assembled relation with the head R while the wheel Q makes a partial revolution. The source of vacuum is connected with the interior of the can during a portion of the revolution and then the source of vacuum is disconnected from the can and the source of steam under pressure is connected to the can, so that it enters the can while the can is being turned into an upsidedown position. The can is removed from the wheel before the wheel makes a complete revolution and the movable part of the valve, which is forced into seating position by the steam pressure within the can is permanently fastened in place by suitably crimping the raised portion of the can end after the general manner shown in Fig. 2.

Having thus described my invention so that those skilled in the art may be able to practice the same, what I desire to secure by Letters Patent is defined in what is claimed.

What is claimed is:

1. The process of treating food stuffs which includes the steps of placing a substantially dry food stuff in an open ended container, inverting the container and retaining said food stuff therein, liberating steam under pressure within and near the closed end of the container and simultaneously draining the condensed steam and other liquid from the container through its open end, and finally sealing the container.

2. The process of treating food stuffs which includes the steps of placing a substantially dry food stuff in an open ended container, inverting the container and retaining said food stuff therein, liberating steam under pressure in the central portion of the container and near its closed end and simultaneously draining condensed steam and other liquid from the container through its open end near the sides of the container, and finally sealing the container.

3. The process of treating food stuffs which includes the steps of placing a solid substantially dry food stuff in an open ended container, inverting the container and retaining said food stuff therein, liberating steam under pressure within and near the closed end of the container until the food stuff has attained a temperature of between about 150° F. and about 212° F. and simultaneously draining condensed steam and other liquid from the container through its open end, and finally sealing the container.

4. The process of treating food stuffs which includes the steps of placing a solid substantially dry food stuff in an open ended container, inverting the container and retaining said food stuff therein, liberating steam under pressure within and near the closed end of the container until the food stuff has become sterilized and simultaneously draining condensed steam and other liquid from the container through its open end, exhausting gases from the interior of the container, and finally sealing the container.

DAVID L. LOETSCHER.